Oct. 12, 1965   A. FISCHER   3,211,042
PIVOTAL ANCHORING ASSEMBLY FOR SCREWS AND THE LIKE
Filed Dec. 8, 1960
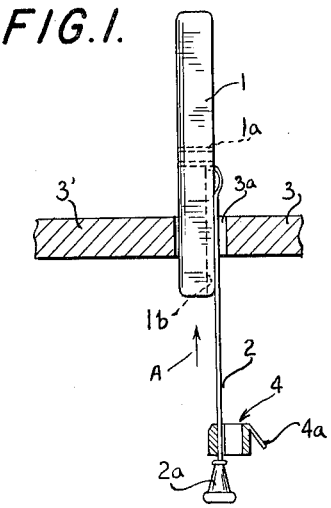
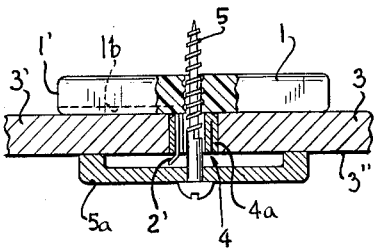
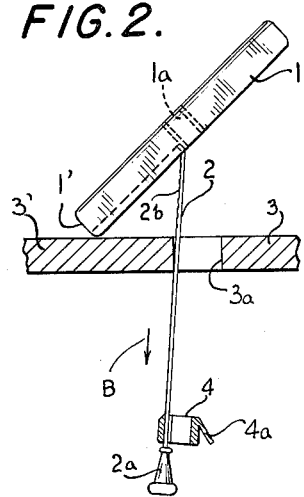
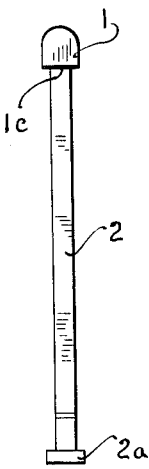
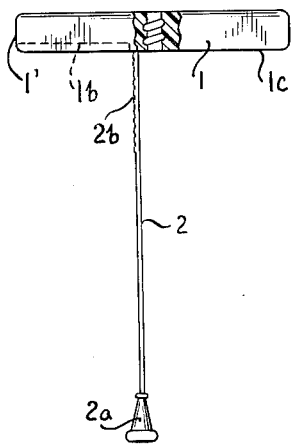
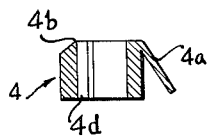
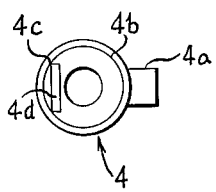
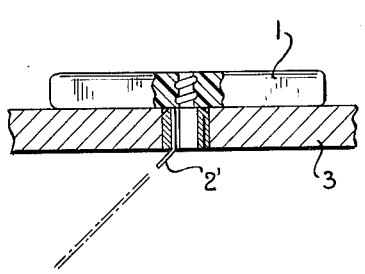
INVENTOR.
Arthur Fischer
BY Michael S. Striker
Attorney

United States Patent Office 3,211,042
Patented Oct. 12, 1965

3,211,042
PIVOTAL ANCHORING ASSEMBLY FOR SCREWS AND THE LIKE
Artur Fischer, Tumlingen, Kreis Freudenstadt, Germany
Filed Dec. 8, 1960, Ser. No. 74,659
Claims priority, application Germany, Dec. 30, 1959,
F 30,211
7 Claims. (Cl. 85—3)

The present invention relates to anchoring assemblies for screws, bolts and like threaded members, and more particularly to an anchoring assembly which is adapted to retain a threaded member in a thin wall or in the wall of a hollow body one side of which is concealed, e.g. in one of two panels forming a hollow wall. Still more particularly, the invention relates to an anchoring assembly belonging to the general class of toggle bolts, expansion anchors, expansion shells and like fastening devices.

A serious disadvantage of presently known fastening devices of the above outlined character is that, say, a one-piece toggle must be provided with a threaded bolt which must be long enough to introduce the toggle all the way through the opening of a wall while the toggle is substantially parallel with the bolt. Such fastening devices are too expensive and, being normally made of metal, cannot resist corrosion excepting when manufactured of a high-quality rustproof material. Furthermore, the fastening devices of presently known design are not suited for the anchoring of wood screws.

An important object of the present invention is to provide an anchoring assembly for retaining a threaded member in the opening of a wall one side of which is not accessible and whose composition or thickness is such that the threaded member cannot be driven directly into the wall material, the anchoring assembly being constructed and assembled in such a way that the length of the threaded member adapted to be anchored therein must exceed only slightly the thickness of the wall and that the threaded member may be completely separated from the anchoring assembly without any danger that the anchoring assembly would change its position with respect to the wall opening.

Another object of the invention is to provide an anchoring assembly of the just outlined characteristics which is capable of retaining wood screws and which can successfully withstand corrosion, acids, lyes and certain other influences which could affect metallic anchoring assemblies of presently known construction.

A further object of the invention is to provide an extremely simple and reliable anchoring assembly which may be manufactured at a very low cost and which is constructed in such a way that it may be inserted through comparatively short as well as through very long openings.

A concomitant object of the invention is to provide an anchoring assembly of the above described type which may be formed as a one-piece article so that the danger of losing one of its components is non-existent and which, even if consisting of two or more components, may be constructed in such a way as to insure that its components cannot be completely separated from each other.

Still another object of the invention is to provide an anchoring assembly for the retention of threaded members in walls having a concealed side, the anchoring assembly being constructed in such a way that the operator can readily locate the bore which receives the threaded member when the assembly is properly mounted in the wall.

A further object of my invention is to provide an anchoring assembly which need not be manufactured in many sizes and shapes because one size will be capable of properly anchoring differently dimensioned and/or configurated threaded members.

An additional object of my invention is to provide an anchoring assembly which is particularly suited for the retention of such threaded members which must be frequently removed from a wall, for example, certain types of hooks, screws for the retention of certain types of electric switches, wall plugs, and the like.

With the above objects in view, the invention resides in the provision of an anchoring assembly which, in its simplest form, comprises an elongated retainer member, hereinafter called pin, and an elongated substantially rigid extension, hereinafter called lug, which is connected to an intermediate portion of the pin. The pin is formed with a transversely extending threaded bore which is preferably immediately adjacent to the point of connection between the pin and the lug, so that, when the pin is inserted through the opening formed in a wall having a concealed side and is thereupon tilted by engaging one of its longitudinal ends with the concealed side of the wall while the lug projects through the opening, the tapped bore is aligned with the wall opening as soon as the pin assumes a position of longitudinal abutment with the concealed side of the wall. By holding the lug with a force sufficient to prevent any undesired displacements of the pin, the operator is then free to drive a threaded member into the tapped bore whereupon the lug may be broken away or cut off of at a point preferably closely adjacent to the exposed end of the wall opening. When the anchoring assembly is put to use, the lug extends longitudinally along and beyond that end of the pin which is to move into abutment with the concealed side of a wall.

In accordance with another feature of my invention, I provide an annular fastening member, hereinafter called a sleeve, which is utilized for permanently holding the pin in retaining position of longitudinal abutment with the concealed side of the wall. The annular sleeve is of such dimensions that it is receivable in and may be satisfactorily fixed in the wall opening, and that it simultaneously retains the lug in such position that the pin is immediately adjacent to and that it actually abuts against the concealed side of the wall. In addition, the sleeve serves as a means for facilitating the insertion of a threaded member, particularly if the wall opening is comparatively large. All that is necessary is to form the sleeve with an aperture whose diameter exceeds only slightly the diameter of the threaded member.

In its preferred form, the entire anchoring assembly consists of a suitable synthetic plastic material, e.g. polyamide, and one terminal of the lug is preferably integral with the pin which can be achieved in a simple way by resorting to an injection molding process. Furthermore, the free terminal of the lug is preferably provided with handgrip means which facilitates its manipulation during the insertion of the pin through a wall opening and which simultaneously prevents the sleeve from becoming lost by complete separation from the lug. For example, the sleeve may be formed with a slot which slidably receives the lug, and a portion of the lug at a point close to the pin is preferably roughened so as to be frictionally receivable in the slot and to thereby insure that the pin will retain its position of abutment with the concealed side of a wall. The remaining portion of the lug is preferably smooth so that the sleeve may readily slide therealong.

The novel features which are considered as characteristic for the invention are set forth in particular in the appended claims. The invention itself, however, both as to its construction and its method of operation, together with additional objects and advantages thereof, will be best understood from the following detailed description of a specific embodiment when read in connection with the accompanying drawing, in which:

FIG. 1 is a partly elevational and partly sectional view of the anchoring assembly showing the retaining pin during actual insertion into the opening of a comparatively thin wall;

FIG. 2 illustrates a further stage in the positioning of the pin when the latter is tilted about one of its ends into alignment with the concealed side of the wall;

FIG. 3 illustrates the pin in its final position adjacent to and in longitudinal abutment with the concealed side of the wall, the fastening sleeve which holds the pin in operative position being fully inserted into the wall opening;

FIG. 4 illustrates an article which is secured to the retaining pin by a threaded member in the form of a wood screw passing through the fastening sleeve;

FIG. 5 is a partly elevational and partly sectional view of the retaining pin and of the extension which is integral with the pin;

FIG. 6 is an end elevational view of the structure shown in FIG. 5;

FIG. 7 is a central section through the fastening sleeve; and

FIG. 8 is an end view of the fastening sleeve.

Referring now in greater detail to the illustrated embodiment, and first to FIG. 1, there is shown an anchoring assembly for wood screws, machine screws, threaded bolts, and the like, which comprises a retaining pin 1, an elongated substantially rigid extension or lug 2 which serves as a guide to facilitate the insertion of the pin into and through the opening 3a of a wall 3, and an annular member or sleeve 4 which serves as a fastening means by maintaining the pin in requisite position with respect to the wall opening 3a. The pin 1 preferably consists of a suitable synthetic plastic material, e.g. polyamide, and is integral with one end of the lug 2, the joint between the pin and the lug being sufficiently flexible to permit a pivoting of the pin from the position of FIG. 1, through the intermediate position of FIG. 2, and into the retaining position of FIG. 3. For example, the pin 1 and its lug 2 may be mass-manufactured by an injection molding process simultaneously with the formation of a tapped bore 1a whose axis is perpendicular to the longitudinal direction of the pin and which is immediately adjacent to that terminal of the lug which is connected to the retaining pin. In other words, the lug is preferably but not necessarily connected to a median portion of the pin; however, the point of connection between the lug and the pin is always somewhat spaced from both longitudinal ends of the pin so that the latter may be readily tilted when one of its longitudinal ends engages the non-accessible or concealed side 3' of the wall 3.

It is now assumed that the element 3 constitutes a comparatively thin wall whose material is too brittle or too soft to properly retain a threaded member, such as a wood screw or a machine screw. Of course, the element 3 may also represent the wall of a hollow body whose interior is not accessible for the application of a washer and/or of a nut to the end of a screw or bolt which is driven therethrough.

In the first step, the operator grips the handgrip means in the form of a knob 2a which is preferably integral with the free terminal of the lug 2, the latter being assumed to project at least partially into a longitudinal peripheral groove 1b provided in the retaining pin 1 so that the lug does not or projects only slightly beyond the outline of the pin. The lug is substantially parallel with and projects well beyond one end of the pin so that the latter may be readily inserted into (FIG. 1) and moved all the way through the opening 3a by advancing the lug 2 in the direction indicated by the arrow A. In the next step, the trailing end face 1' of the pin 1 is moved into abutment with the concealed side 3' of the wall 3, and the lug 2 is pulled into the direction of the arrow B (see FIG. 2). It will be noted that the edges of the pin 1 are preferably somewhat rounded so that the latter will readily slide along the concealed side 3' in response to a force exerted upon the lug 2 in the direction indicated by the arrow B, particularly since the lug exerts a tilting moment owing to its connection with the pin 1 at a point distant from the end face 1'.

When the pin 1 is tilted into the position of FIG. 3, the lug 2 which, as shown in FIGS. 5 and 6, preferably assumes the form of a thin flat strip, is bent laterally and away from the opening 3a so that the operator may drive a threaded member, e.g. a wood screw 5 which is shown in FIG. 4, into the bore 1a of the pin. The lug 2 is then cut off or broken away in close proximity of the opening 3a because the pin is now held in proper position by the threaded member 5. As shown in FIG. 4, the threaded member is utilized for securing a metallic bracket 5a to the outer side 3" of the wall 3, but it will be readily understood that the member 5 may be replaced by a hook which is formed with a threaded end portion, by a machine screw, or by any other part which comprises an externally threaded portion adapted to be driven into the bore 1a.

It has been found that the portion 2' of the lug 2 which remains on the retaining pin 1 (see FIG. 3) will normally penetrate into the material of the wall 3 when the screw 5 is driven home, particularly if the diameter of the opening 3a is such that it receives the shank of the screw 5 with very small clearance. Thus, the embedded lug portion 2' may serve as a means for securing the pin to the wall 3 so that the pin will retain its position of FIG. 3 or 4 even if the screw 5 is withdrawn from the bore 1a. The portion 2' is preferably roughened to frictionally engage the wall of the bore 3a.

In order to avoid any interference during the insertion of the screw 5 or of a similar threaded member, the lug 2 assumes the form of a flat strip whose thickness is preferably held to a minimum; consequently, the latter cannot always insure that the pin will retain its operative position of FIG. 3 or 4 when the screw 5 is withdrawn from the bore 1a. Therefore, the improved anchoring assembly preferably comprises an annular member or sleeve 4 which serves as a fastening means for permanently holding the pin in longitudinal abutment with the concealed side 3' of the wall 3 so that the screw 5 may be driven home and withdrawn as often as desired. The provision of the sleeve 4 is particularly desirable when the material of the wall 3 is very hard and/or very brittle so that the lug portion 2' cannot be embedded therein.

When the wall 3 is comparatively thin, the operator will meet little difficulty in locating the tip of the screw 5 in the bore 1a, particularly since the lug portion 2' insures a rather tight fit of the screw in the opening 3a, and also because the connection between the lug 2 and the retaining pin 1 is immediately adjacent to the bore 1a. However, the insertion of the screw tip into the bore 1a is somewhat more difficult when the wall 3 is rather thick and when the diameter of the opening 3a exceeds substantially the diameter of the screw, i.e. when the screw 5 is loosely insertable into the wall opening. In such instances, the fastening sleeve 4 will be of considerable assistance by insuring that the operator will immediately locate the bore 1a. Of course, the diameter of the axial aperture in the sleeve 4 should exceed only slightly the diameter of the threaded member 5.

In one of its preferred forms, the sleeve 4 consists of a suitable at least partially rigid synthetic plastic material and is of such dimensions as to be receivable with a tight friction fit in the opening 3a. To insure that the sleeve 4 will remain in the opening 3a, I preferably provide one or more outwardly extending flaps 4a (see FIGS. 7 and 8) which project from the periphery of the sleeve and whose thickness is sufficient to necessitate the exertion of a certain force during insertion of the sleeve into the opening 3a so that the sleeve assumes a position as shown in FIGS. 3 and 4. The outer side of the flap 4a is preferably roughened to insure a better frictional engagement with the wall of the bore 3a. The edge portion 4b surrounding the forward end face of the sleeve 4 is normally rounded to facilitate initial insertion of the sleeve into the opening 3a, and the sleeve is preferably slitted, as at 4c (see FIG. 8), which also insures a better retaining action.

In order to prevent complete separation of the components 1–2 and 4 of the anchoring assembly, the sleeve 4 is formed with an axially parallel slot 4d whose dimensions are selected in such a way that it may slidably receive the lug 2, i.e. that the smooth portion of the sleeve may be shifted along the lug all the way from the handgrip means 2a to the proximity of the pin 1. Thus, when the operator completes the tilting of the pin into the position of FIG. 3, he grasps the handgrip means 2a with the fingers of one of his hands and shifts the sleeve 4 with his other hand until the sleeve is properly received in and frictionally engages the wall of the opening 3a.

A more satisfactory retention of the sleeve 4 in the opening 3a may be insured if at least that portion of the lug 2 which is adjacent to the pin is formed with a knurled, ribbed or otherwise roughened surface 2b which must be forced into the slot 4b when the sleeve is received in the opening 3a so that the roughened portion 2b and the wall of the slot 4d form a very strong connection between the lug 2 and the sleeve 4. The provision of such roughened portion 2b is advisable because it prevents the operator from pushing the sleeve 4 all the way through the opening 3a, i.e. the operator is warned as soon as he meets an increasing resistance while holding the handgrip means 2a and while simultaneously shifting the sleeve toward the pin 1. As stated before, the main purpose of the sleeve 4 is to insure satisfactory retention of the pin in operative position even if the screw 5 is repeatedly removed from the bore 1a.

As is best shown in FIG. 6, the pin 1 is preferably provided with an elongated flat face 1c which comes into full face-to-face abutment with the concealed wall surface 3' so as to insure that the threaded bore 1a is coaxial with the opening 3a, i.e. the plane of the face 1c is preferably perpendicular to the axis of the bore 1a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An anchoring assembly for retaining a threaded member in the opening of a wall having a concealed side, comprising elongated retaining means consisting of rigid synthetic plastic material, said retaining means having a longitudinal end and formed with transversely extending tapped bore means spaced from said end; and a single substantially rigid elongated flat strip shaped extension of synthetic plastic material having a flexible terminal portion integral with and extending transversal to the elongation of said elongated retaining means at a point adjacent to said bore means, said extension having a length exceeding the distance between said point and the end of said retaining means and bendable about said terminal in a single plane into and out of substantial parallelism with said retaining means so that it extends beyond the end of said retaining means and that it may be grasped by hand during introduction of said retaining means through the wall opening until the end of said retaining means abuts against the concealed side of the wall, said substantially rigid elongated extension being sufficiently flexible to permit pivoting of said retaining means about said terminal to move said bore means into alignment with the wall opening and to enable a threaded member to be driven into said bore means if a pull is exerted on said extension in a direction to withdraw the extension from the wall opening.

2. An assembly as set forth in claim 1, wherein said extension has a second terminal formed as a handgrip means by which the extension is manipulated during insertion and pivoting of said retaining means.

3. An assembly as set forth in claim 1, wherein said retaining means is a smooth-surfaced substantially cylindrical pin.

4. An assembly as set forth in claim 1, wherein said extension has a roughened portion adjacent to said terminal for frictionally engaging the wall when a threaded member is driven through the wall opening and into said bore means.

5. An assembly as set forth in claim 1, further comprising annular fastening means receivable in the wall opening for engaging said extension and for thereby holding said retaining means in a position in which said bore means is aligned with the wall opening.

6. An assembly as set forth in claim 5, wherein said fastening means is a slitted sleeve which is frictionally retainable in the wall opening.

7. An anchoring assembly for retaining a threaded member in the opening of a wall having a concealed side, comprising elongated retaining means consisting of rigid synthetic plastic material, said retaining means having a longitudinal end and formed with transversely extending tapped bore means spaced from said end; a single substantially rigid elongated extension of synthetic plastic material having a flexible terminal integral with said retaining means at a point adjacent to said bore means and comprising a roughened portion adjacent to said terminal, said extension having a length exceeding the distance between said point and the end of said retaining means and bendable about said terminal into substantial parallelism with said retaining means so that it extends beyond the end of said retaining means and that it may be grasped by hand during introduction of said retaining means through the wall opening until the end of said retaining means abuts against the concealed side of the wall, said substantially rigid elongated extension being sufficiently flexible to permit pivoting of said retaining means about said terminal to move said bore means into alignment with the wall opening and to enable a threaded member to be driven into said bore means if a pull is exerted on said extension in a direction to withdraw the extension from the wall opening; and a sleeve having surface means receivable in the wall opening to engage the surface surrounding said opening and having slit means frictionally receiving the roughened portion of said extension so that the extension and the retaining means are held against displacement with respect to said sleeve.

References Cited by the Examiner

UNITED STATES PATENTS

| | | | |
|---|---|---|---|
| 860,636 | 7/07 | Church. | |
| 1,108,922 | 9/14 | Menten | 85—3 |
| 1,506,123 | 8/24 | Hubener. | |
| 2,301,135 | 11/42 | Molat. | |
| 2,567,372 | 9/51 | Gelpcke. | |
| 2,765,134 | 10/56 | Hill. | |
| 2,836,215 | 5/58 | Rapata | 151—41.75 |
| 2,908,196 | 10/59 | Apfelzweig | 85—3 |
| 2,998,743 | 9/61 | Apfelzweig | 85—3 |

EDWARD C. ALLEN, *Primary Examiner.*

CARL W. TOMLIN, *Examiner.*